HENDRIK CANCRINUS
AND PAULUS VAN JASON
Inventors

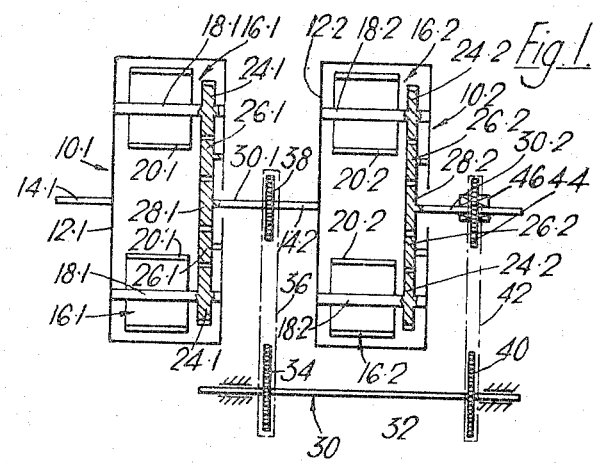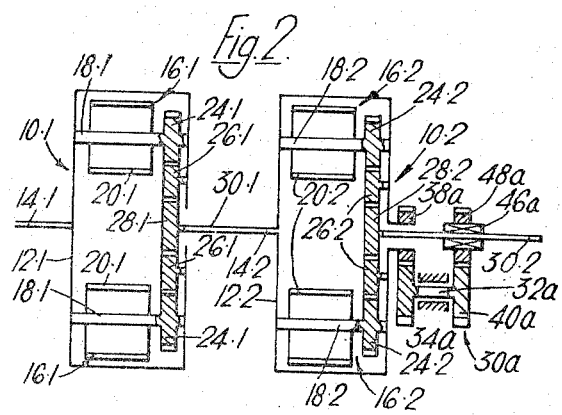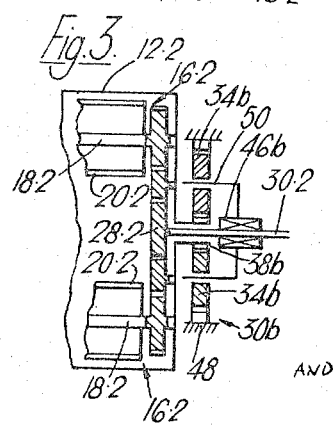
HENDRIK CANCRINUS
AND PAULUS VAN JASON
Inventors

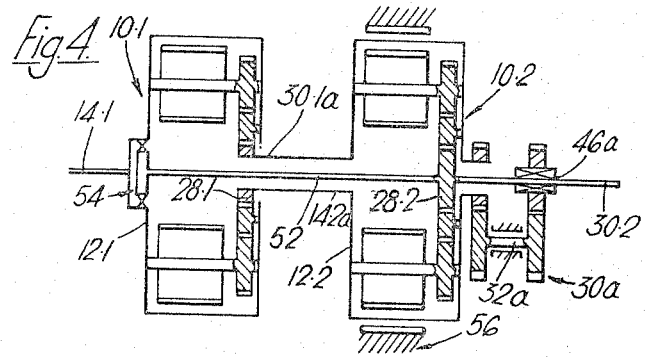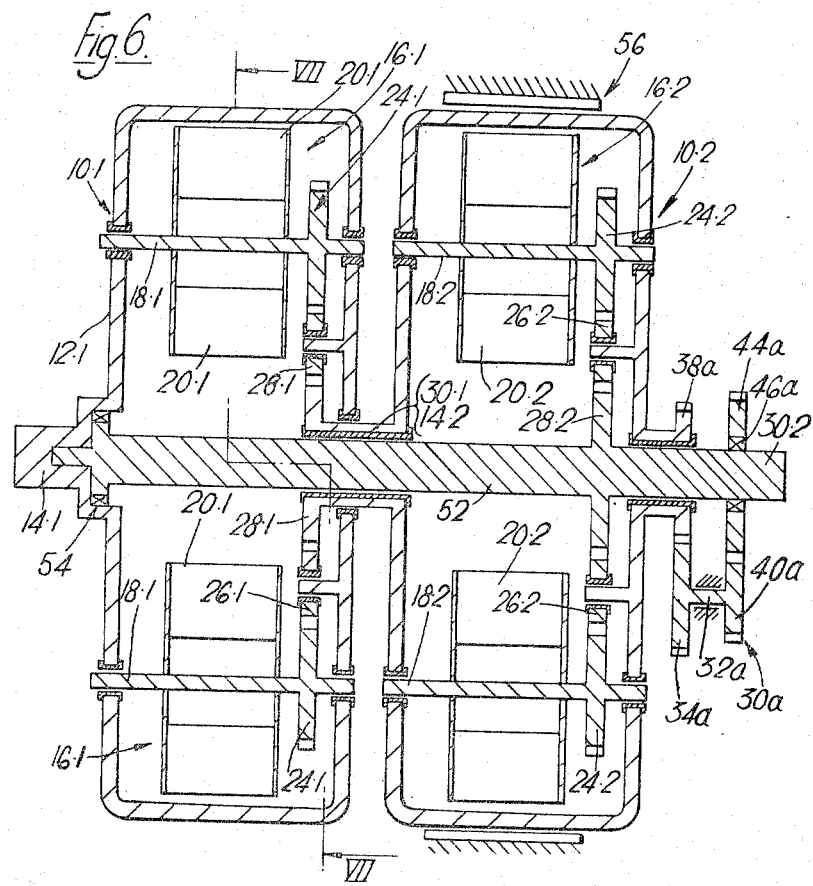

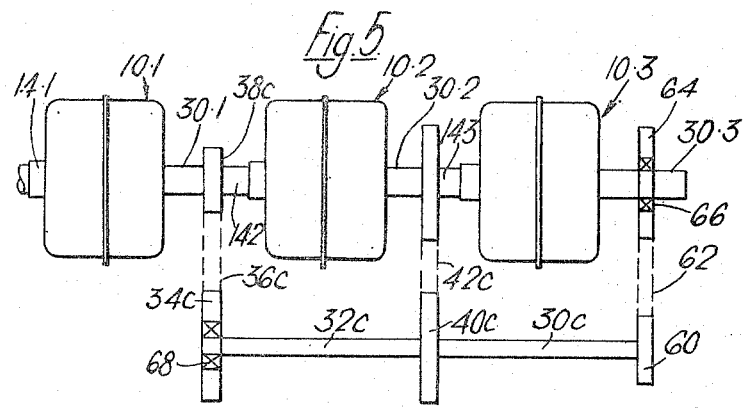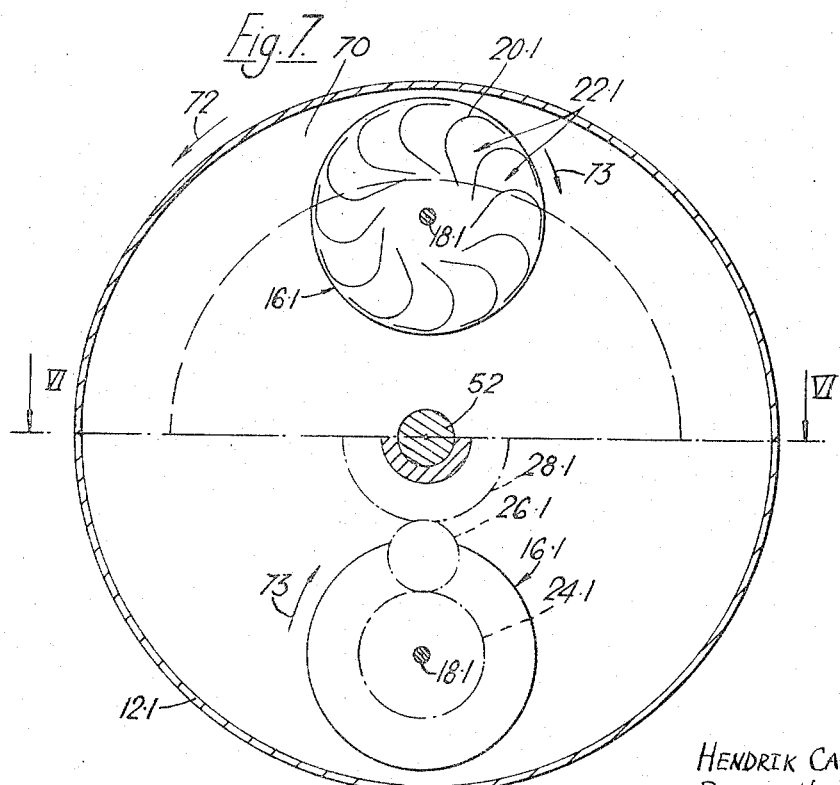

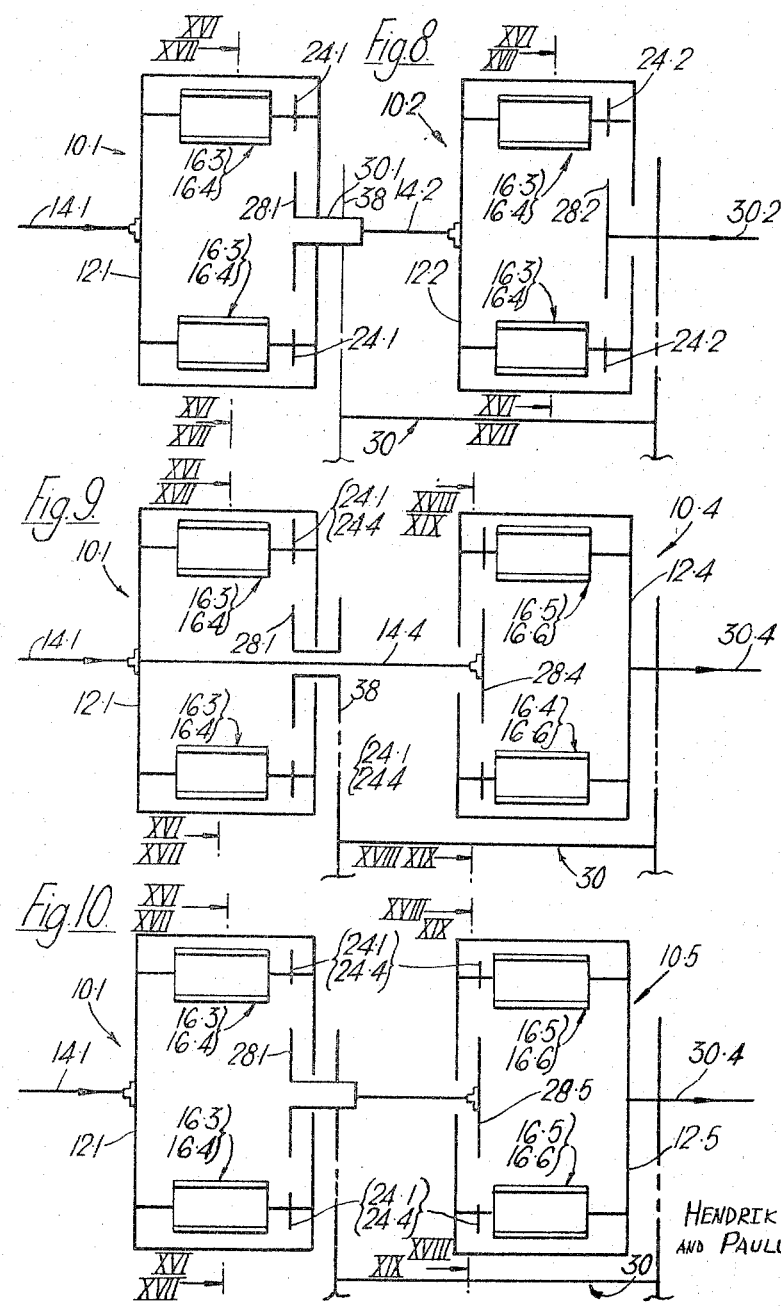

By Wenderoth Lind
& Ponack
Attorneys

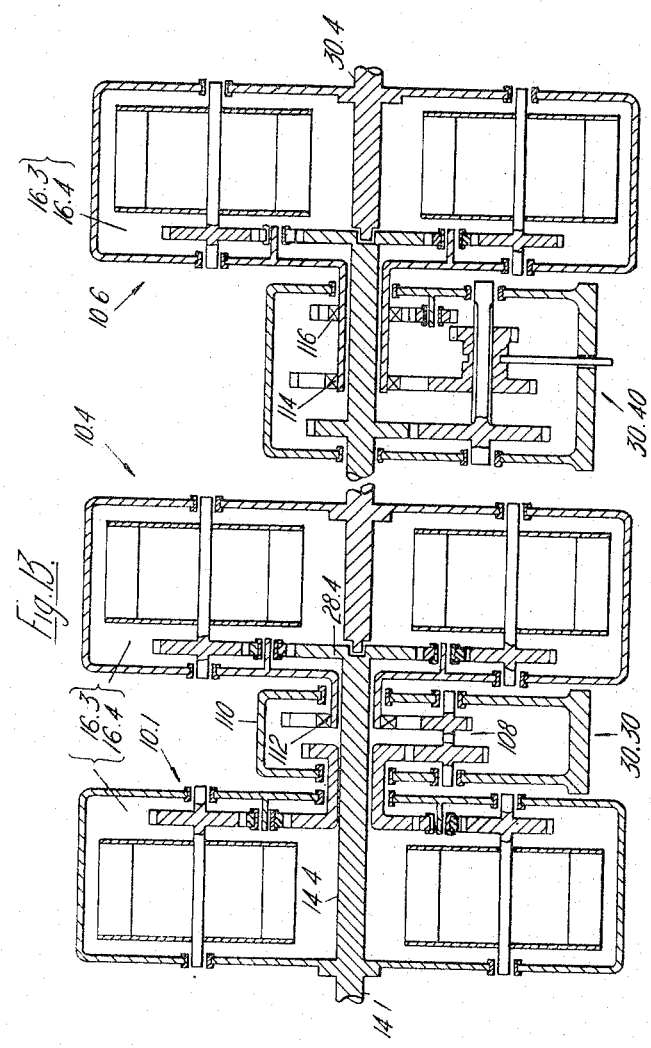

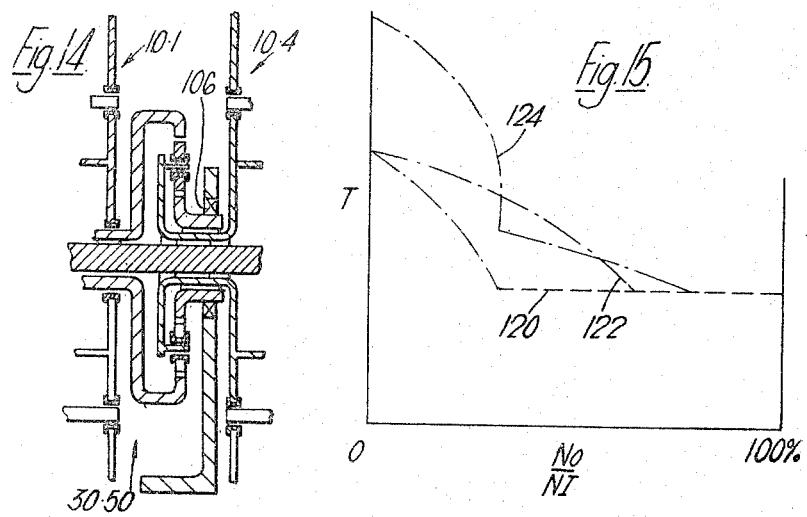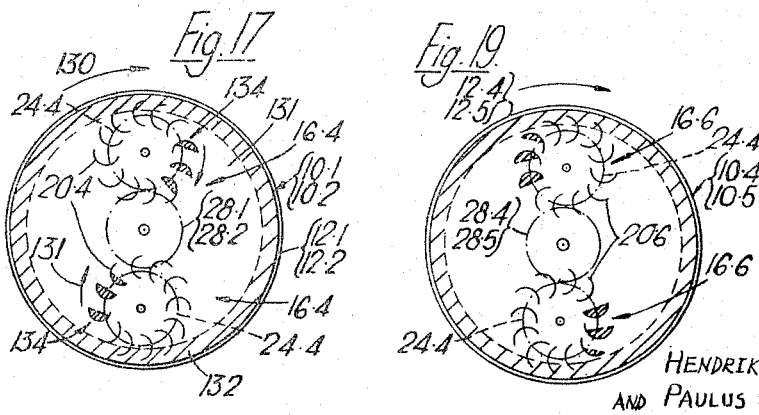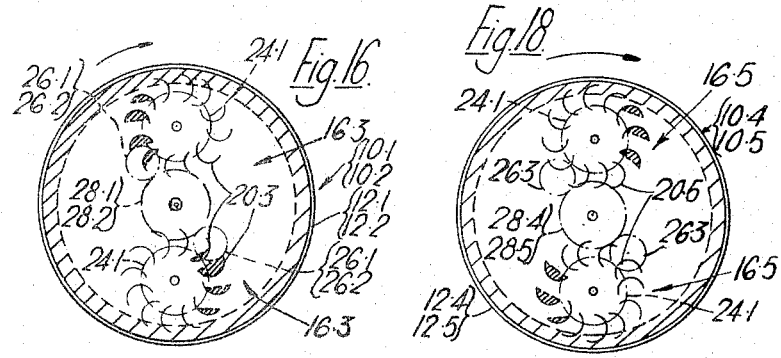

United States Patent Office 3,334,529
Patented Aug. 8, 1967

3,334,529
FLUID TORQUE TRANSMITTER
Hendrik Cancrinus, Rondebosch, Cape Province, and Paulus Van Jason, Constantia, Cape Province, Republic of South Africa, assignors to Inpower Works (Proprietary) Limited, Cape Town, Cape Province, Republic of South Africa
Filed Apr. 14, 1965, Ser. No. 448,161
Claims priority, application Republic of South Africa, Apr. 15, 1964, 64/1,762; Mar. 30, 1965, 65/1,678
26 Claims. (Cl. 74—752)

ABSTRACT OF THE DISCLOSURE

A fluid torque convertor embodying a plurality of fluid couplings, each fluid coupling being adapted to generate torque under centrifugal force by the entrapment of an unbalanced mass of fluid from a fluid reservoir, the fluid couplings having their outputs interconnected via transfer drive means.

---

This invention relates to torque convertors using hydraulic fluid, and to couplings comprised in such torque convertors.

According to the invention, a torque convertor comprises (i) two interconnected fluid couplings, each fluid coupling comprising:
  (a) a carrier mounted for rotation about its axis, referred to as the carrier rotational axis;
  (b) a plurality of liquid entrapping wheels, each liquid entrapping wheel being mounted for rotation on the carrier about its own liquid entrapping wheel rotational axis, which is spaced away from the carrier rotational axis;
  (c) a liquid reservoir provided at the outer periphery of the liquid entrapping wheels, the liquid entrapping wheels being adapted to entrap liquid from the liquid reservoir;
  (d) a driven wheel co-axial with the carrier and rotatable relative thereto and drivingly connected to the liquid entrapping wheel;
  the carrier of the first fluid coupling having connection means for connection to a rotary power input; and the second fluid coupling having an output member for connection to a load; and
(ii) transfer drive means drivingly connecting the driven wheel of the first fluid coupling to the carrier of the second coupling.

The carrier of the first fluid coupling may be drivingly connected to the driven wheel of the second fluid coupling.

Alternatively, the driven wheel of the first fluid coupling may be drivingly connected to the driven wheel of the second fluid coupling.

The driving connection between the driven wheel and liquid-entrapping wheels of each coupling may include toothed planet wheels connected with the liquid-entrapping wheels, and idlers rotatably mounted on the carrier and meshing simultaneously with the planet wheels and driven wheels. The liquid-entrapping wheels of the couplings may have buckets of C-section having their openings directed in one direction about the axis of the liquid-entrapping wheels, the openings of the buckets for the first and second couplings being arranged in opposite directions about the liquid entrapping wheel axis. The openings of the buckets of the first coupling may be directed to the central region of the drum on the trailing side of the liquid retainer wheel relative to the direction of rotation of the carrier about its axis.

If desired, a third coupling may be provided having its carrier or its driven wheel drivingly connected to the output member of the second coupling, and having its driven wheel drivingly connected to a final output member. A further transfer drive means which may include a free wheel device, may be provided, drivingly connecting the output member of the second coupling to the final output member.

It will be clear, therefore, that more than two couplings may be connected. The arrangement is such that the output members of subsequent couplings are drivingly interconnected via transfer drive means to the output members of earlier couplings. If desired, the final output member, connected to the last coupling in the series, may have a free wheel device.

In each coupling, the reservoir may be in the form of a drum, coaxial and integral with the carrier of the coupling.

The driving connection between the driven wheel and liquid-entrapping wheels of the coupling, may include toothed planet wheels connected with the liquid-entrapping wheels, and meshing directly with the driven wheel. Alternatively, the driving connection may include idlers, mounted for rotation on the carrier, and meshing simultaneously with the planet wheels and with the driven wheel.

The invention extends also to a coupling comprising:
  (a) A carrier mounted for rotation about its axis, referred to as the carrier rotational axis;
  (b) A plurality of bucket wheels, each bucket wheel being mounted for rotation on the carrier about its own bucket wheel rotational axis, which is spaced away from the carrier rotational axis; each bucket wheel having a plurality of buckets of C-section arranged about the bucket wheel rotational axis, the buckets having their openings directed in one direction about the bucket wheel rotational axis and being so disposed that the openings of the buckets on the leading side of the bucket wheel relative to the direction of rotation of the carrier about the carrier rotational axis, are directed towards the region about the carrier rotational axis; the openings of the buckets being defined by inner and outer lips relative to the bucket wheel axis, and a clearance space being provided between the inner lips and between the outer lips of adjacent buckets and between the inner lips of opposed buckets of each bucket wheel to permit diametrical flow of liquid through the bucket wheel;
  (c) A liquid reservoir provided at the outer periphery of the bucket wheels, the buckets of the bucket wheels being adapted to entrap liquid from the liquid reservoir;
  (d) Toothed planet wheels fast and co-axial with the bucket wheels;
  (e) A toothed sun wheel co-axial with the carrier and rotatable relative thereto and in mesh with the toothed planet wheels; and
  (f) Connection means for connecting the toothed sun wheel to an output member for connection to a load or another fluid coupling.

The invention further extends to a coupling comprising:
  (a) A carrier mounted for rotation about its axis, referred to as the carrier rotational axis;
  (b) A plurality of bucket wheels, each bucket wheel being mounted for rotation on the carrier about its own bucket wheel rotational axis, which is spaced away from the carrier rotational axis; each bucket wheel having a plurality of buckets of C-section arranged about the bucket wheel rotational axis, the buckets having their openings directed in one direction about the bucket wheel rotational axis and being so disposed that the openings of the buckets on the trailing side of the bucket wheel relative to the direction of rotation of the carrier about the carrier rotational axis, are directed towards the region about the carrier rotational axis; the openings of the buckets being defined by inner and outer lips relative to the bucket wheel axis, and a clearance space being provided between the inner lips and between the outer lips of adjacent buckets and between the inner lips of opposed buckets of each bucket wheel to permit diametrical flow of liquid through the bucket wheel;

(c) A liquid reservoir provided at the outer periphery of the bucket wheels, the buckets of the bucket wheels being adapted to entrap liquid from the liquid reservoir;

(d) Toothed planet wheels fast and co-axial with the bucket wheels;

(e) A toothed sun wheel co-axial with the carrier and rotatable relative thereto and in mesh with the toothed planet wheels; and (f) Connection means for connecting the toothed sun wheel to an output member for connection to a load or to another fluid coupling.

The sun wheel may have a hollow bore to permit a shaft to pass rotatably coaxially through it, and the carrier may have means for connecting such a shaft drivingly to it.

The driven wheel may have connecting means for connecting it drivingly to a reduction gear train.

The reservoir may be in the form of a drum coaxial and integral with the carrier.

Various embodiments of the invention will now be described by way of example, with reference to the accompanying drawings.

In the drawings:

FIGURE 1 shows diagrammatically an axial section of one embodiment of the invention, incorporating one type of transfer drive means;

FIGURE 2 shows diagrammatically an axial section of another embodiment of the invention incorporating another type of transfer drive means;

FIGURE 3 shows diagrammatically a fragmentary axial section of another embodiment of the invention incorporating yet another type of transfer drive means;

FIGURE 4 shows diagrammatically an axial section of a development of the embodiment shown in FIGURE 2;

FIGURE 5 shows diagrammatically a yet further embodiment of the invention employing a multiple of couplings;

FIGURE 6 shows diagrammatically but in greater detail an axial section at VI—VI in FIGURE 7, of the embodiment shown in FIGURE 4;

FIGURE 7 shows diagrammatically a section elevation at VII—VII in FIGURE 6;

FIGURE 8 shows a diagrammatic layout in axial section of the embodiment shown in FIGURE 1;

FIGURE 9 shows a diagrammatic layout in axial section of another embodiment showing a different connection between couplings;

FIGURE 10 shows a diagrammatic layout in axial section, of yet another arrangement having another type of connection between the couplings;

FIGURE 13 shows an axial section, of a multiple of couplings as shown in FIGURE 9, connected in tandem;

FIGURE 14 shows an axial section of an alternative form of transfer drive means between adjacent couplings;

FIGURE 15 shows torque speed characteristic curves obtainable with the various arrangements;

FIGURE 16 shows diagrammatically a cross-sectional view at XVI—XVI in FIGURES 8, 9 and 10 of the disposition of buckets about liquid-entrapping wheel axes, and of the driving connection between driven and planet wheels;

FIGURES 17 shows diagrammatically a cross-sectional view at XVII—XVII in FIGURES 8, 9 and 10 of alternative dispositions of the buckets about the liquid-entrapping wheel axes and of the driving connection between the driven wheel and planet wheels;

Figure 11:
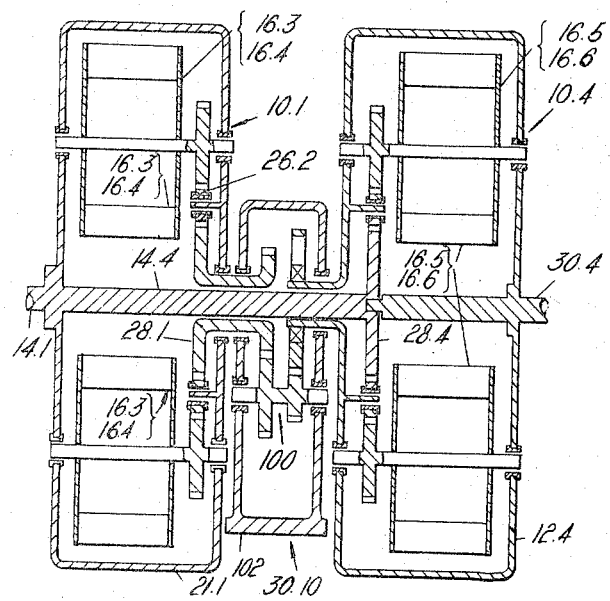
FIGURE 11 shows an axial section of an embodiment similar to that shown in FIGURE 9, but having the transfer drive means in the form of a gear train.

FIGURE 18 shows diagrammatically a cross-section at XVIII—XVIII in FIGURES 9 and 10 of the disposition of buckets about the liquid-entrapping wheel axes, and of the driving connection between planet and driven wheels; and FIGURE 19 shows diagrammatically a cross-section at XIX—XIX in FIGURES 9 and 10, of an alternative arrangement of buckets about liquid-entrapping wheel axes and of the driving connection between planet wheels and driven wheel.

Referring now to FIGURES 1 to 7 of the drawings, reference numeral 10.1 refers generally to a first coupling comprising a carrier in the form of a drum 12.1, the carrier and drum being integral, and having drive connecting means in the form of an input shaft 14.1, for connecting it to a source of rotary power. The carrier 12.1 and the input shaft 14.1 are coaxial.

With the drum 12.1 there are provided a plurality of liquid-entrapping wheels 16.1, mounted in dynamic balance about the drum axis, and mounted to rotate about their own axes 18.1. Each of the liquid-entrapping wheels has liquid-entrapping means 20.1 defining a plurality of recesses spaced circumferentially away from and around the planet wheel axes. Referring to FIGURES 6 and 7, the liquid-entrapping means 20.1 are shown in the form of substantially C-section buckets, defining recesses 22.1 away from the liquid-entrapping wheel axis. The openings of the C-section buckets are arranged in one direction about the liquid-entrapping wheel axes.

The liquid-entrapping wheels 16.1 are connected to toothed gear wheels 24.1 meshing with idlers 26.1, which in turn mesh with a driven wheel in the form of a sun wheel 28.1 of the coupling, and which is coaxial with the input shaft 14.1, and with the carrier 12.1.

The second coupling is generally indicated by reference numeral 10.2, and has similar parts which are similarly numbered to the parts of the first coupling 10.1, except that the decimal parts of the reference numerals have been changed to indicate that they refer to the second coupling.

The sun wheel 28.1 has connected to it an output shaft 30.1, which may be directly connected or integral with the input shaft 14.2 of the second coupling.

The transfer drive means generally indicated by reference numeral 30 in FIGURE 1, comprises a lay shaft 32, having a sprocket 34 driven by a chain 36, from a sprocket 38 fast with the shafts 30.1 and 14.2. The lay shaft 32 also has a sprocket 40 engaging with a chain 42, driving onto a sprocket 44, coaxial with the shaft 30.2 connected to the sun wheel 28.2 and engaging with it via a free wheel device 46.

In FIGURE 2, the transfer drive means 30a comprises a lay shaft 32a having fast with it a toothed gear wheel 34a engaging with a toothed gear wheel 38a fast with the carrier 12.2, and coaxial with it. The lay shaft 32a also has fast with it a toothed gear wheel 40a engaging with another toothed gear 44a, coaxial with the shaft 30.2, and engaging with it via free wheel device 46a.

Referring to FIGURE 3, the transfer drive means 30b comprises an anchor ring gear 48, planet gear wheels 34b, meshing simultaneously with the anchor ring gear 48, and with a transfer drive means sun wheel 38b, fast with the carrier 12.2 of the second coupling, and coaxial with it. The planet wheels 34b are mounted on a spider 50, coaxial with the sun wheel 28.2, and with the shaft 30.2, the spider 50 engaging with shaft 30.2 via a free wheel device 46b.

Referring now to FIGURE 4 of the drawings, the transfer drive means 30a is the same as that shown in FIGURE 2. This embodiment differs, however, from that shown in FIGURE 2, in that the sun wheel 28.1 is connected to the carrier 12.2 via a hollow shaft 30.1a, 14.2a. Coaxial with this hollow shaft, there is provided a shaft 52, fast with the sun wheel 28.2, and engaging with the carrier 12.1 of the first coupling, via a free wheel device 54. The free wheel device 54 is provided to permit the load to drive the prime mover when the load overruns the prime mover. In addition, there is provided brake means 56, adapted to hold the carrier 12.2 of the second coupling, against idling torques, when a reverse gear (not shown) is being engaged, the reverse gear being provided between the transfer drive means and the shaft 30.2.

It will be understood that the free wheel devices 46, 46a and 46b may be provided anywhere in the transfer drive means, for example, device 46 could be provided between the sprockets 38 and the shaft 30.1, 14.2, or between the sprocket 34 and the lay shaft 32, or between the sprocket 40 and the lay shaft 32. The free wheeling devices 46a and 46b could be similarly repositioned in their respective transfer drive means 30a, and 30b.

Referring now to FIGURE 5 of the drawings, it will be noted that couplings 10.1, 10.2 and 10.3, are connected in series, and the whole arrangement has transfer drive means, generally indicated by reference numeral 30c, comprising a lay shaft 32c arranged to connect the output shafts 30.1 and 30.2 of the couplings 10.1 and 10.2, to the output shaft 30.3 of the coupling 10.3, and which also serves as the main output shaft. The drive from the lay shaft 32c, onto the output shaft 30.3, takes place via the sprocket 60, chain drive 62, onto a sprocket 64, coaxial with the output shaft 30.3, and engaging with it via a free wheel device 66. It will be noted that a free wheel device 68 is provided between the sprocket 34c and the lay shaft 32c.

The operation of a single coupling only will now be described, and then the operation of a plurality of couplings in tandem will be described.

For operation, hydraulic fluid is placed inside the drums of each of the couplings, the fluid being thrown out in an annular layer 70, when the drum of the coupling is rotated about its axis in the direction of arrow 72 (see FIGURE 7). In rotating, the drum carries idler wheel 26.1 around with it, and assuming that the sun wheel 28.1 is stationary, the idler wheel 26.1 will rotate about its axis in an anti-clockwise direction, when viewed in the direction of FIGURE 7, and will cause the planet wheel 24.1 to rotate relative to the carrier about its axis in a clockwise direction (see arrow 73). When the ratio of the pitch circle diameters of the planet wheels 24.1 and the sun wheel 28.1 is unity, and when the sun wheel 28.1 is stationary, the planet wheel will perform a full revolution about its axis in a clockwise direction relative to the carrier, for every revolution of the carrier in an anti-clockwise direction. The planet wheel thereby performs a motion which may be termed circular translation. In doing so, the liquid entrapping means in the form of buckets 20.1, will dip into the annular layer 70, and will entrap liquid from the layer, and will carry the liquid over towards the central region of the drum, on the trailing side of the liquid-entrapping wheel relative to the direction of rotation of the carrier. There will thus be an unbalanced mass of liquid on the trailing side of the liquid-entrapping wheel, and the centrifugal force acting on this unbalanced mass, will generate a torque about the planet wheel axis 18.1, and this torque will be carried over via the idler wheels 26.1, onto the sun wheel 28.1, and will be available as an output torque on the sun wheel 28.1. When the speed of the sun wheel 28.1 is the same as the input speed to the carrier 12.1, then the bucket wheels 16.1 no longer rotate about their axes relative to the carrier and the torque generated by centrifugal force acting on the unbalanced mass of liquid on the trailing side of the bucket wheel is sufficient to balance the load torque on the sun wheel 28.1. The bucket wheels 16.1 are then carried around in unison with the carrier 12.1. The coupling 10.2 operates in similar fashion.

By connecting the sun wheel 28.1 to the carrier 12.2 via the shafts 30.1 and 14.2, the carrier 12.2 of the coupling 10.2, has the same speed as the sun wheel 28.1, of the first coupling 10.1 when rotary power is applied to its shaft 14.1. The torque generated by the unbalanced mass of liquid in the liquid-entrapping means of the coupling 10.1, is therefore adapted to speed up the rotation of the sun wheel 28.1, and hence of the carrier 12.2 of the second coupling. Dependent upon the speed of the second coupling, part of this torque is, however, directly carried over via the transfer drive means 30, 30a or 30b onto the output shaft 30.2, which is directly connected to the sun wheel 28.2 of the second coupling.

The transfer drive means converts this portion of the torque, and an output torque being a multiple of the input torque is then available on the output shaft 30.2. The torque applied to the sun wheel 28.1, will cause it to speed up and hence the speed of rotation of the carrier 12.2 will increase, resulting in an increase of the generation of torque by the liqudi-entrapping wheels 16.2, which is then transferred onto the sun wheel 28.2 of the second coupling 10.2. The torque generated by the liquid-entrapping wheels of the second coupling 10.2, is then also available on the output shaft 30.2.

During start-up of the apparatus, the output shaft 30.2 is stationary, and hence the output shaft 30.1 of the first coupling is also stationary, and hence the second coupling can absorb no torque from the prime mover, and therefore the full torque of the prime mover is transmitted over the reduction ratio of the transfer drive means, onto the main output shaft 30.2. This results in the maximum torque multiplication being obtained at starting. As the output shaft 30.2 speeds up, so does the carrier 12.2 of the second coupling 10.2 also speed up, and thus starts to generate torque which is then transmitted directly onto the output shaft 30.2.

When three couplings are used in tandem, then the velocity ratios between the various couplings constituting the apparatus as a whole may be chosen as desired.

The free wheel devices 46, 46a, 46b, 66, and 68, are provided to ensure that the output shaft 30.2 or 30.3 can overrun the gears or sprockets 44, 44a, 64, or the spider 50.

Referring now to FIGURES 8, 9 and 10 of the drawings, various combinations of couplings are shown. The embodiment shown in FIGURE 8 of the drawings, shows diagrammatically the combination of couplings shown in FIGURES 1, 2, 3 and 4. It is possible, as will be noted from FIGURE 17 of the drawings, that the means, drivingly connecting the planet wheels and sun wheels, may include the direct meshing between the planet wheels and sun wheels and that idlers need not be provided between them.

The embodiment shown in FIGURE 9 varies somewhat from the embodiment shown in FIGURE 8 in that the sun wheel 28.4 of the embodiment shown in FIGURE 9 is connected by a shaft 14.4, to the carrier 12.1 of the first coupling, the carrier 12.4 of the second coupling being connected to the output shaft 30.4. It will be noted that the sun wheel 28.1 of the embodiment shown in FIGURE 9 is rotatable relative to the shaft 14.4. In other respects, this embodiment is similar to that shown in FIGURE 8 and in particular, transfer drive means 30 is provided between the sun wheel 28.1 and the output member 30.4. In this embodiment of the invention, the first coupling 10.1 may have idler wheels 26.1 between the sun wheel 28.1 and the planet wheel 24.1. (See FIGURE 16.) Alternatively, if desired (see FIGURE 17), the planet wheels 24.4, may mesh directly with the sun wheels 28.1. However, it will be noted, by comparing the disposition of the buckets 20.3 and 20.5 of the bucket wheels 16.3 and 16.5, that the buckets are disposed so that the openings are directed in opposite directions about the bucket wheel axes. (See FIGURES 16 and 18.) Furthermore, when no idler wheels are used between the planet wheels and sun wheel, then the buckets of the second coupling 10.4 are directed oppositely to those of the first coupling 10.1. In this connection, please refer to FIGURES 17 and 19 of the drawings.

The embodiment shown in FIGURE 10 is a further variation of the connection between couplings 10.1 and 10.5. The sun wheel 28.5 of the coupling 10.5 is connected via a shaft 14.5 to the sun wheel 28.1 of the first coupling 10.1. The carrier 12.5 of the coupling 10.5 is connected to the output member 30.4. In this embodiment also, the sun wheel 28.1 is connected via transfer drive means 30 to the output member 30.4. In this embodiment also, the disposition of the buckets of the second coupling 10.5 is in a direction opposite to that of the buckets in the first coupling 10.1. It is also possible to have the driving connection between the planet wheels and the sun wheel by direct meshing, or by way of idlers. In this connection, please refer to FIGURES 16 to 19 of the drawings.

Referring now to FIGURE 11, this drawing shows in greater detail an axial section of the embodiment like that shown in FIGURE 9 but having a different type of transfer drive means 30.10. It will be noted that the transfer drive means 30.10 constitutes a gear train 100 housed within a housing 102. It will be noted that a free wheel device 104 is provided in the gear train.

Figure 12:
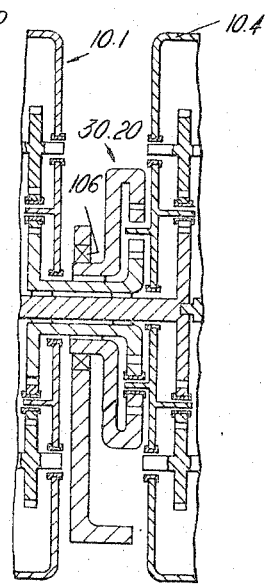
FIGURE 12 shows an axial section of a coupling similar to that in FIGURE 11, but having another type of gear train for its transfer drive means.

FIGURE 12 shows an alternative construction of transfer drive means 30.20. In this case also it will be noted that a free wheel device 106 is provided.

FIGURE 13 shows a development of the embodiment shown in FIGURE 9, in greater detail. It shows the possibility of connecting a plurality of couplings in series. The first two couplings have transfer drive means 30.30 connected between them comprising a gear train 108 housed within a housing 110. A free wheel device 112 is provided in the gear train. Subsequent couplings are connected in series, of which one is shown at 10.6, and with a transfer drive means such as that shown at 30.40. This transfer drive means 30.40 has free wheel devices 114 and 116. In FIGURE 13, the last coupling is shown as 10.6. The output member 30.6 of this coupling is fast with the carrier of the coupling, and constitutes the output shaft of the combination.

FIGURE 14 shows yet another type of transfer drive means 30.50 between adjacent couplings.

FIGURE 15 shows the torque speed characteristics of the output shaft of the various combinations of couplings. The speed of the output shaft is expressed as a percentage of the speed of the input shaft. The characteristic curve 120 indicates a torque available from a combination of couplings as shown in FIGURE 8, and in which the transfer drive means has a ratio of 2 to 1.

The characteristic curve 122 shows the torque available from a combination of couplings as shown in FIGURE 9 and in which the ratio of the transfer drive means is 2 to 1.

The torque characteristic 124 is that obtainable from a coupling such as FIGURE 9, but having a further coupling connected in series, that is, a torque convertor comprising three couplings in tandem and connected on similar lines to that shown in FIGURE 13.

The FIGURE 8 arrangement is advantageous for applications where a constant input speed is available.

The embodiment shown in FIGURE 9 is useful for a variable input speed. The output speed of this arrangement is the output speed of the second coupling. The speed of the sun wheel 28.4, that is, the sun wheel of the second coupling, is the same as the input speed. At starting, the bucket wheels in the coupling 10.4 rotate at input speed in the drum 12.4 which is then stationary. There is therefore no annular layer of fluid within the drum 12.4, but the bucket wheels in the drum 12.4 stir up the liquid and torque is absorbed from the prime mover. The absorbed torque is not multiplied when transferred to the output shaft 30.4.

The arrangement shown in FIGURE 10 is also useful for variable input speeds. The speed of the sun wheel 28.5 of the second coupling 10.5 is the output speed of the first coupling 10.1. The speed of the output shaft 30.4 is the same as the output speed of the second coupling. At starting of the arrangement, the second coupling is inoperative, that is, the drum 12.5 is stationary and the bucket wheels within it are also stationary. However, as the sun wheel 28.1 of the first coupling speeds up, so the sun wheel 28.5 also speeds up. Furthermore, the drum 12.5 also speeds up, as a result of drive received from the shaft 30.4 via the transfer drive means 30. As the drum 12.5 speeds up, so more and more troque is absorbed from the prime mover connected to the input shaft 14.1.

For convenience the second couplings 10.4 and 10.5 of FIGURES 9 and 10 are referred to as reversed couplings. The term "reversed couplings" is used because their sun wheels are connected to the first coupling 10.1 and because their buckets 16.5 and 16.6 are arranged to have their openings directed about the bucket wheel axes in a direction opposite to those of the bucket wheels 16.3 and 16.4.

Refer now to the first couplings 10.1 only (without considering their connection to the second couplings). When there is direct meshing between planet wheels 24.4 and sun wheels 28.1 and 28.2 (see FIGURE 17), rotary power applied to the carrier shown in the direction of arrow 130 in FIGURE 17 will cause it to rotate about its axis thereby causing fluid contained by it to be thrown out in a layer 132. During start-up, while the speed of the sun wheel 28.1 is less than that of the input shaft 14.1, the bucket wheels 16.4 will rotate about their axis relative to the carrier in the direction of arrow 131. Such rotation will cause the buckets to displace fluid from the annular layer 132 thereby absorbing torque. This torque is transmitted to the sun wheel 28.1 via the planet wheel 24.4 (see FIGURE 17 and FIGURES 9 and 10) and is available to drive a load.

As the sun wheel 28.1 speeds up, so the rate of rotation of the planet wheels 24.4 and of the bucket wheels 16.4 relative to the carrier slows down. While rotation of the bucket wheels relative to the carrier is fast, it whirls liquid away from the bucket wheel axis as a result of centrifugal force. But as its rate of rotation relative to the carrier slows down, its buckets 20.4 retain liquid at 134 on the leading sides of the bucket wheels 16.4 relative to the direction of the rotation of the carrier 12.1. Centrifugal force acting on the retained liquid as a result of the rotation of the carrier 12.1 about its axis causes a moment about the bucket wheel axis. This moment is transferred to the sun wheel 28.1 via the planet wheels 24.4, and is available as an output torque to drive a load. At full speed, the sun wheel 28.1 rotates at the same speed and in the same direction as the carrier 12.1 and the bucket wheels 16.4 are stationary relative to the carrier 12.1 and are carried around by it. Only so much liquid will be retained as is necessary to balance the load torque.

If the load varies then the bucket wheels 16.4 will rotate slightly about their axes relative to the carrier to take up more or less liquid. If the load increases beyond the capacity of the coupling then the bucket wheels 16.4 will start rotating again about their axes relative to the carrier and slip will take place. The maximum torque which it can transmit will be its starting torque.

At the time when the bucket wheel 16.4 is rotating slowly about its axis relative to the carrier, i.e., when the centrifugal force away from its axis is less than that away from the carrier axis, then fluid displaced from the layer 132 by the buckets 20.4 is rejected in the central region of the drum. The rejected fluid then flows diametrically through the bucket wheel 16.4 to the outer layer.

An advantage of the combination of a plurality of couplings, together with transfer drive means, is that a torque convertor can be obtained having a high starting torque, the torque conversion being automatic without requiring independent control.

In the description and drawings the couplings have been described and shown as each having its own drum. It will be understood that all the carriers can be mounted in a single drum which may or may not be integral with the carrier of the first coupling. The liquid entrapping wheels of each carrier may then be mounted in a separate compartment of the drum if desired.

In this specification, the term "prime mover" is intended to include an electric motor and any other suitable source of rotary power.

We claim:
1. A torque convertor comprising:
   (i) two inter-connected fluid couplings, each fluid coupling comprising
      (a) a carrier mounted for rotation about its axis, referred to as the carrier rotational axis;
      (b) a plurality of liquid entrapping wheels, each liquid entrapping wheel being mounted for rotation on the carrier about its own liquid entrapping wheel rotational axis, which is spaced away from the carrier rotational axis;
      (c) a liquid reservoir provided at the outer periphery of the liquid entrapping wheels, the liquid entrapping wheels being adapted to entrap liquid from the liquid reservoir;
      (d) a driven wheel co-axial with the carrier and rotatable relative thereto and drivingly connected to the liquid entrapping wheel;
   the carrier of the first fluid coupling having connection means for connection to a rotary power input; and the carrier of the second fluid coupling having an output member for connection to a load; and
   (ii) transfer drive means drivingly connecting the driven wheel of the first fluid coupling to the carrier of the second fluid coupling.

2. A torque convertor according to claim 1 in which each coupling includes a reservoir in the form of a drum coaxial and integral with its carrier.

3. A torque convertor according to claim 1 in which at least for the first coupling, the driving connection between the sun wheel and liquid-entrapping wheels include toothed planet wheels connected with the liquid-entrapping wheels, and idlers meshing simultaneously with the planet wheels and the sun wheels.

4. A torque convertor according to claim 1, in which the carrier of the first fluid coupling is drivingly connected to the driven wheel of the second fluid coupling.

5. A torque convertor according to claim 4 in which the driving connection between the sun wheel and the liquid-entrapping wheels of the one coupling, include toothed planet wheels connected with the liquid-entrapping wheels and meshing directly with the sun wheel, the driving connection of the other coupling including toothed planet wheels fast with the liquid-entrapping wheels and tooth idler wheels meshing with the planet wheels and sun wheel, the liquid-entrapping wheels of both couplings having buckets of C-section having their openings directed in the same direction about the axes of the liquid-entrapping wheels, the openings of the buckets of both couplings being directed to the central region of the drum on the same side of the liquid-entrapping wheel relative to the direction of rotation of the carrier about its axis.

6. A torque convertor according to claim 4 in which the driving connection between the sun wheel and liquid-entrapping wheels of each coupling, include toothed planet wheels connected with the liquid-entrapping wheels, and idlers rotatably mounted on the carrier and meshing simultaneously with the planet wheels and the sun wheel.

7. A torque convertor according to claim 6 in which the liquid-entrapping means of the couplings are in the form of buckets of C-section having their openings directed in one direction about the axis of the liquid-entrapping wheel, the openings of the buckets for the first and second couplings being arranged in opposite directions about the liquid-entrapping wheel axes, the openings of the buckets of the first coupling being directed to the central region of the drum on the trailing side of the liquid-entrapping wheel relative to the direction of rotation of the carrier about its axis.

8. A torque convertor according to claim 1, in which the driven wheel of the first fluid coupling is drivingly connected to the driven wheel of the second fluid coupling.

9. A torque convertor according to claim 8 in which the driving connection between the sun wheel and the liquid-entrapping wheels of the one coupling, include toothed planet wheels connected with the liquid-entrapping wheels and meshing directly with the sun wheel, the driving connection of the other coupling including toothed planet wheels fast with the liquid-entrapping wheels and tooth idler wheels meshing with the planet wheels and sun wheel, the liquid-entrapping wheels of both couplings having buckets of C-section having their openings directed in the same direction about the axes of the liquid-entrapping wheels, the openings of the buckets of both couplings being directed to the central region of the drum on the same side of the liquid-entrapping wheel relative to the direction of rotation of the carrier about its axis.

10. A torque convertor according to claim 8 in which the driving connection between the sun wheel and liquid-entrapping wheels of each coupling, include toothed planet wheels connected with the liquid-entrapping wheels, and idlers rotatably mounted on the carrier and meshing simultaneously with the planet wheels and the sun wheel.

11. A torque convertor according to claim 10 in which the liquid-entrapping means of the couplings are in the form of buckets of C-section having their openings directed in one direction about the axis of the liquid-entrapping wheel, the openings of the buckets for the first and second couplings being arranged in opposite directions about the liquid-entrapping wheel axes, the openings of the buckets of the first coupling being directed to the central region of the drum on the trailing side of the liquid-entrapping wheel relative to the direction of rotation of the carrier about its axis.

12. A torque convertor comprising
   (i) three inter-connected fluid couplings; each fluid coupling comprising:
      (a) a carrier mounted for rotation about its axis, referred to as the carrier rotational axis;
      (b) a plurality of liquid entrapping wheels, each liquid entrapping wheel being mounted for rotation on the carrier about its own liquid entrapping wheel rotational axis, which is spaced away from the carrier rotational axis;
      (c) a liquid reservoir provided at the outer periphery of the liquid entrapping wheels, the liquid entrapping wheels being adapted to entrap liquid from the liquid reservoir;
      (d) a driven wheel co-axial with the carrier and rotatable relative thereto and drivingly connected to the liquid entrapping wheels;
   the carrier of the first fluid coupling having connection means for connection to a rotary power, and the carrier of the third fluid coupling having an output member for connection to a load; the driven wheel of the first fluid coupling being drivingly connected to the carrier of the second fluid coupling and the driven wheel of the second fluid coupling being drivingly connected to the driven wheel of the third fluid coupling;
(ii) transfer drive means drivingly connecting the driven wheel of the first fluid coupling to the driven wheel of the second fluid coupling, and the driven wheel of the second fluid coupling to the carrier of the third fluid coupling.

13. A torque convertor according to claim 12, in which the driving connection between the sun wheel and liquid-entrapping wheels of the third coupling, include toothed planet wheels connected with the liquid-entrapping wheels, and idlers rotatably mounted on the carrier and meshing simultaneously with the planet wheels and the sun wheel.

14. A torque transmitter according to claim 13, in which the liquid-entrapping means of the couplings are in the form of buckets of C-section having their openings directed in one direction about the axes of the liquid-entrapping wheels, the openings of the buckets of the first coupling being directed to the central region of the drum on the trailing side of the liquid-entrapping wheels relative to the direction of rotation of the carrier about its axis, and being directed about the liquid-entrapping wheel axes in a direction opposite to that of the openings of the buckets of the liquid-entrapping wheels of the second and third couplings.

15. A torque convertor comprising:
(i) three inter-connected fluid couplings; each fluid coupling comprising:
   (a) a carrier mounted for rotation about its axis, referred to as the carrier rotational axis;
   (b) a plurality of liquid entrapping wheels, each liquid entrapping wheel being mounted for rotation on the carrier about its own liquid entrapping wheel rotational axis, which is spaced away from the carrier rotational axis;
   (c) a liquid reservoir provided at the outer periphery of the liquid entrapping wheels, the liquid entrapping wheels being adapted to entrap liquid from the liquid reservoir;
   (d) a driven wheel co-axial with the carrier and rotatable relative thereto and drivingly connected to the liquid entrapping wheels;
   the carrier of the first fluid coupling having connection means for connection to a rotary power input; and the carrier of the third fluid coupling having an output member for connection to a load; the driven wheel of the first fluid coupling being drivingly connected to the carrier of the second fluid coupling, and the carrier of the second fluid coupling being drivingly connected to the driven wheel of the third fluid coupling;
(ii) transfer drive means drivingly connecting the driven wheel of the first fluid coupling to the driven wheel of the second fluid coupling and the driven wheel of the second fluid coupling to the carrier of the third fluid coupling.

16. A torque converter comprising
(i) three inter-connected fluid couplings; each fluid coupling comprising:
   (a) a carrier mounted for rotation about its axis, referred to as the carrier rotational axis;
   (b) a plurality of liquid entrapping wheels, each liquid entrapping wheel being mounted for rotation on the carrier about its own liquid entrapping wheel rotational axis, which is spaced away from the carrier rotational axis;
   (c) a liquid reservoir provided at the outer periphery of the liquid entrapping wheels, the liquid entrapping wheels being adapted to entrap liquid from the liquid reservoir,
   (d) a driven wheel co-axial with the carrier and rotatable relative thereto and drivingly connected to the liquid entrapping wheels;
   the carrier of the first fluid coupling having connection means for connection to a rotary power input; and the driven wheel of the third fluid coupling having an output member for connection to a load; the carrier of the first fluid coupling being drivingly connected to the driven wheel of the second fluid coupling; and the carrier of the second fluid coupling being drivingly connected to the carrier of the third fluid coupling;
(ii) transfer drive means drivingly connecting the driven wheel of the first fluid coupling to the carrier of the second fluid coupling and the carrier of the second fluid coupling to the driven wheel of the third fluid coupling.

17. A torque converter comprising
(i) three inter-connected fluid couplings; each fluid coupling comprising
   (a) a carrier mounted for rotation about its axis, referred to as the carrier rotational axis;
   (b) a plurality of liquid entrapping wheels, each liquid entrapping wheel being mounted for rotation on the carrier about its own liquid entrapping wheel rotational axis, which is spaced away from the carrier rotational axis;
   (c) a liquid reservoir provided at the outer periphery of the liquid entrapping wheels, the liquid entrapping wheels being adapted to entrap liquid from the liquid reservoir;
   (d) a driven wheel co-axial with the carrier and rotatable relative thereto and drivingly connected to the liquid entrapping wheels;
   the carrier of the first fluid coupling having connection means for connection to a rotary power input; and the carrier of the third fluid coupling having an output member for connection to a load; the carrier o fthe first fluid coupling being drivingly connected with the driven wheel of the second fluid coupling and the carrier of the second fluid coupling being drivingly connected with the driven wheel of the third fluid coupling;
(ii) transfer drive means drivingly connecting the driven wheel of the first fluid coupling with the carrier of the second fluid coupling and the carrier of the second fluid coupling with the carrier of the third fluid coupling.

18. A torque converter comprising
(i) three inter-connected fluid couplings; each fluid coupling comprising:
   (a) a carrier mounted for rotation about its axis, referred to as the carrier rotational axis;
   (b) a plurality of liquid entrapping wheels, each liquid entrapping wheel being mounted for rotation on the carrier about its own liquid entrapping wheel rotational axis, which is spaced away from the carrier rotational axis;
   (c) a liquid reservoir provided at the outer periphery of the liquid entrapping wheels, the liquid entrapping wheels being adapted to entrap liquid from the liquid reservoir;
   (d) a driven wheel co-axial with the carrier and rotatable relative thereto and drivingly connected to the liquid entrapping wheels;
   the carrier of the first fluid coupling having connection means for connection to a rotary power input; and the driven wheel of the third fluid coupling having an output member for connection to a load; the driven wheel of the first fluid coupling being drivingly connected with the driven wheel of the second fluid coupling, and the carrier of the second fluid coupling being drivingly connected to the carrier of the third fluid coupling;
(ii) transfer drive means drivingly connecting the driven wheel of the first fluid coupling to the carrier of the second fluid coupling and the carrier of the second fluid coupling to the driven wheel of the third fluid coupling.

19. A torque convertor comprising:
(i) three inter-connected fluid couplings; each fluid coupling comprising:
  (a) a carrier mounted for rotation about its axis, referred to as the carrier rotational axis;
  (b) a plurality of liquid entrapping wheels, each liquid entrapping wheel being mounted for rotation on the carrier about its own liquid entrapping wheel rotational axis, which is spaced away from the carrier rotational axis;
  (c) a liquid reservoir provided at the outer periphery of the liquid entrapping wheels, the liquid entrapping wheels being adapted to entrap liquid from the reservoir;
  (d) a driven wheel co-axial with the carrier and rotatable relative thereto and drivingly connected to the liquid entrapping wheels;
  the carrier of the first fluid coupling having connection means for connection to a rotary power input; and the carrier of the third fluid coupling having an output member for connection to a load; the driven wheel of the first fluid coupling being drivingly connected to the driven wheel of the second fluid coupling, and the carrier of the second fluid coupling being drivingly connected to the driven wheel of the third fluid coupling;
(ii) transfer drive means drivingly connecting the driven wheel of the first fluid coupling to the carrier of the second fluid coupling, and the carrier of the second fluid coupling to the carrier of the third fluid coupling.

20. A coupling comprising
(a) a carrier mounted for rotation about its axis, referred to as the carrier rotational axis;
(b) a plurality of bucket wheels, each bucket wheel being mounted for rotation on the carrier about its own bucket wheel rotational axis; which is spaced away from the carrier rotational axis; each bucket wheel having a plurality of buckets of C-section arranged about the bucket wheel rotational axis; the buckets having their openings directed in one direction about the bucket wheel rotational axis and being so disposed that the openings of the buckets on the leading side of the bucket wheel relative to the direction of rotation of the carrier about the carrier rotational axis, are directed towards the region about the carrier rotational axis; the openings of the buckets being defined by inner and outer lips relative to the bucket wheel axis, and a clearance space being provided between the inner lips and between the outer lips of adjacent buckets and between the inner lips of opposed buckets of each bucket wheel to permit diametrical flow of liquid through the bucket wheel;
(c) a liquid reservoir provided at the outer periphery of the bucket wheels, the buckets of the bucket wheels being adapted to entrap liquid from the liquid reservoir;
(d) toothed planet wheels fast and co-axial with the bucket wheels;
(e) a toothed sun wheel coaxial with the carrier and rotatable relative thereto and in mesh with the toothed planet wheels; and
(f) connection means for connecting the toothed sun wheel to an output member for connection to a load or another fluid coupling.

21. A fluid coupling according to claim 20 in which the sun wheel has a hollow bore to permit a shaft to pass rotatably coaxially through it, and in which the carrier has means for connecting such a shaft drivingly to it.

22. A fluid coupling according to claim 20 and in which the sun wheel has connecting means for connecting it drivingly to a reduction gear train.

23. A fluid coupling accordingly to claim 20 and in which the reservoir is in the form of a drum coaxial and integral with the carrier.

24. A coupling comprising
(a) a carrier mounted for rotation about its axis, referred to as the carrier rotational axis;
(b) a plurality of bucket wheels, each bucket wheel being mounted for rotation on the carrier about its own bucket wheel rotational axis, which is spaced away from the carrier rotational axis; each bucket wheel having a plurality of buckets of C-section arranged about the bucket wheel rotational axis; the buckets having their openings directed in one direction about the bucket wheel rotational axis, and being so disposed that the openings of the buckets on the trailing side of the bucket wheel relative to the direction of rotation of the carrier about the carrier rotational axis, are directed towards the region about the carrier rotational axis; the openings of the buckets being defined by inner and outer lips relative to the bucket wheel axis, and a clearance space being provided between the inner lips and between the outer lips of adjacent buckets and between the inner lips of opposed buckets of each bucket wheel to permit diametrical flow of liquid through the bucket wheel;
(c) a liquid reservoir provided at the outer periphery of the bucket wheels, the buckets of the bucket wheels being adapted to entrap liquid from the liquid reservoir;
(d) toothed planet wheels fast and co-axial with the bucket wheels;
(e) a toothed sun wheel co-axial with the carrier and rotatable relative thereto and in mesh with the toothed planet wheels; and
(f) connection means for connecting the toothed sun wheel to an output member for connection to a load or another fluid coupling.

25. A torque convertor comprising the combination of transfer drive means with two inter-connected fluid couplings, each coupling comprising:
(a) a carrier mounted for rotation about its axis, referred to as the carrier rotational axis;
(b) a plurality of bucket wheels, each bucket wheel being mounted for rotation on the carrier about its own bucket wheel rotational axis, which is spaced away from the carrier rotational axis; each bucket wheel having a plurality of buckets of C-section arranged about the bucket wheel rotational axis, the buckets having their openings directed in one direction about the bucket wheel rotational axis; the openings of the buckets being defined by inner and outer lips relative to the bucket wheel axis, and a clearance space being provided between the inner lips and between the outer lips of adjacent buckets and between the inner lips of opposed buckets of each bucket wheel to permit diametrical flow of liquid through the bucket wheel;
(c) a liquid reservoir provided at the outer periphery of the bucket wheels, the buckets of the bucket wheels being adapted to entrap liquid from the liquid reservoir;
(d) toothed planet wheels fast and co-axial with the bucket wheels;
(e) a toothed sun wheel co-axial with the carrier and rotatable relative thereto and in mesh with the toothed planet wheels; and
(f) connection means for connecting the toothed sun wheel to an output member for connection to a load or another fluid coupling,
  the carrier of the first fluid coupling being drivingly connected to the sun wheel of the second fluid coupling, and the transfer drive means transferring drive from the sun wheel of the first fluid coupling to the carrier of the second coupling, the openings of the buckets of the first and second fluid couplings being arranged in opposite directions about the bucket wheel axes, the openings of the buckets of the first coupling being directed to the central region of the drum on the leading side of the bucket wheel relative to the direction of rotation of the carrier about its axis.

26. A torque convertor comprising the combination of transfer drive means with two inter-connected couplings, each coupling comprising:
(a) a carrier mounted for rotation about its axis, referred to as the carrier rotational axis;
(b) a plurality of bucket wheels, each bucket wheel being mounted for rotation on the carrier about its own bucket wheel rotational axis, which is spaced away from the carrier rotational axis; each bucket wheel having a plurality of buckets of C-section arranged about the bucket wheel rotational axis; the buckets having their openings directed in one direction about the bucket wheel rotational axis; the openings of the buckets being defined by inner lips and outer lips relative to the bucket wheel axis, and a clearance space being provided between the inner lips and between the outer lips of adjacent buckets and between the inner lips of opposed buckets of each bucket wheel to permit diametrical flow of liquid through the bucket wheel;
(c) a liquid reservoir provided at the outer periphery of the bucket wheels, the buckets of the bucket wheels being adapted to entrap liquid from the liquid reservoir;
(d) toothed planet wheels fast and co-axial with the bucket wheels;
(e) a toothed sun wheel co-axial with the carrier and rotatable relative thereto and in mesh with the toothed planet wheels; and
(f) connection means for connecting the toothed sun wheel to an output member for connection to a load or another fluid coupling,
the sun wheel of the first fluid coupling being drivingly connected to the sun wheel of the second fluid coupling and the transfer drive means transferring drive from the sun wheel of the first fluid coupling to the carrier of the second fluid coupling, the openings of the buckets of the first and second fluid couplings being arranged in opposite directions about the bucket wheel axes, the openings of the buckets of the first fluid coupling being directed to the central region of the leading side of the bucket wheel relative to the direction of rotation of the carrier about its axis.

References Cited
UNITED STATES PATENTS

| | | | |
|---|---|---|---|
| 1,568,639 | 1/1926 | Swart | 74—774 |
| 1,720,236 | 7/1929 | Reece et al. | 74—752 |
| 1,720,238 | 7/1929 | Reece et al. | 74—752 |
| 1,933,143 | 10/1933 | Janssen | 74—752 |
| 1,936,165 | 11/1933 | Janssen | 74—752 |
| 2,475,085 | 7/1949 | Dunn | 74—655 |
| 3,077,793 | 2/1963 | Cancrinus | 74—752 |

CARLTON R. CROYLE, *Primary Examiner.*

ARTHUR T. McKEON, *Examiner.*